US 11,654,455 B2

(12) United States Patent
Johnson et al.

(10) Patent No.: US 11,654,455 B2
(45) Date of Patent: May 23, 2023

(54) POLYMER REINFORCED SCREENING PANEL

(71) Applicant: Polydeck Screen Corporation, Spartanburg, SC (US)

(72) Inventors: Ryan Johnson, Moore, SC (US); Peter Freissle, Spartanburg, SC (US); Greg Anderson, Spartanburg, SC (US)

(73) Assignee: POLYDECK SCREEN CORPORATION, Spartanburg, SC (US)

( * ) Notice: Subject to any disclaimer, the term of this patent is extended or adjusted under 35 U.S.C. 154(b) by 366 days.

(21) Appl. No.: 16/923,663

(22) Filed: Jul. 8, 2020

(65) Prior Publication Data
US 2021/0008594 A1 Jan. 14, 2021

Related U.S. Application Data

(60) Provisional application No. 62/871,294, filed on Jul. 8, 2019.

(51) Int. Cl.
B07B 1/46 (2006.01)
B07B 1/28 (2006.01)
C08L 21/00 (2006.01)
C08J 5/04 (2006.01)
C08L 75/04 (2006.01)
B01D 33/54 (2006.01)

(52) U.S. Cl.
CPC ............ B07B 1/4663 (2013.01); B01D 33/54 (2013.01); B07B 1/28 (2013.01); C08J 5/042 (2013.01); C08J 5/043 (2013.01); C08L 21/00 (2013.01); C08L 75/04 (2013.01)

(58) Field of Classification Search
CPC ....... B07B 1/4663; B07B 1/28; B07B 1/4645; B07B 1/46; B07B 1/4609; B07B 1/4681; B07B 1/469; B01D 33/54; B01D 33/0353; C08J 5/042; C08J 5/043; C08L 21/00; C08L 75/04
USPC .......................................... 209/363
See application file for complete search history.

(56) References Cited

U.S. PATENT DOCUMENTS

| 6,267,246 | B1 | 7/2001 | Russell et al. |
| 7,861,866 | B1 | 1/2011 | Ondrias |
| 8,544,655 | B2 | 10/2013 | Trench et al. |
| 9,308,555 | B2 | 4/2016 | Yaver |

(Continued)

FOREIGN PATENT DOCUMENTS

| KR | 20080092027 A | * | 10/2008 |
| KR | 20130003480 A | * | 6/2011 |

(Continued)

Primary Examiner — Gene O Crawford
Assistant Examiner — Muhammad Awais
(74) Attorney, Agent, or Firm — Dority & Manning, P.A.

(57) ABSTRACT

A screen panel for a vibratory machine is disclosed. The screen panel can include a reinforcing structure having a top surface. The reinforcing structure can define a plurality of apertures through the reinforcing structure. A polymer layer can have a bottom surface that is arranged over the top surface of the reinforcing structure. The polymer layer can define a plurality of apertures therethrough. Each aperture of the plurality of apertures of the polymer layer can be aligned with a single respective aperture of the plurality of apertures of the reinforcing structure.

19 Claims, 8 Drawing Sheets

(56) References Cited

U.S. PATENT DOCUMENTS

| | | | |
|---|---|---|---|
| 2005/0236305 A1* | 10/2005 | Schulte, Jr. | B01D 33/0376 209/403 |
| 2008/0078702 A1* | 4/2008 | Carr | B07B 1/4609 209/326 |
| 2009/0071879 A1* | 3/2009 | Helmy | B07B 1/4645 209/412 |
| 2009/0308795 A1* | 12/2009 | Smith | B07B 1/4618 209/397 |
| 2010/0044281 A1 | 2/2010 | Johnson et al. | |
| 2010/0140147 A1* | 6/2010 | Olsen | B07B 1/4645 209/392 |
| 2011/0285541 A1* | 11/2011 | Freissle | B07B 1/4645 209/370 |
| 2013/0126397 A1 | 5/2013 | Ghosh | |
| 2015/0021241 A1* | 1/2015 | Ralph | B07B 1/4618 209/408 |
| 2015/0190847 A1* | 7/2015 | Lipa | B07B 1/4681 264/263 |
| 2018/0001351 A1* | 1/2018 | Marshall | B07B 1/4663 |

FOREIGN PATENT DOCUMENTS

| | | | | |
|---|---|---|---|---|
| KR | 20130003480 A * | 1/2013 | | |
| WO | WO-2018091095 A1 * | 5/2018 | | B07B 1/46 |
| WO | WO 2018091095 A1 | 5/2018 | | |
| WO | WO-2018091157 A1 * | 5/2018 | | B07B 1/46 |

* cited by examiner

POLYMER REINFORCED SCREENING PANEL

CROSS-REFERENCE TO RELATED APPLICATION

The present application claims filing benefit of U.S. Provisional Patent Application Ser. No. 62/871,294 having a filing date of Jul. 8, 2019, which is incorporated herein by reference in its entirety.

FIELD

The present disclosure relates generally to screening systems, and more particularly to screening systems for vibratory machines.

BACKGROUND

Screening systems are used in the mining and other industries to size and separate desired materials from less desired materials. Certain screening systems include modular screening systems which are composed of a plurality of modular and replaceable screening media (e.g., screen panels) mounted to a support frame. The screening media includes a plurality of apertures dimensioned to separate the desired material from less desired material.

Screening media can include modular screen panels which are removably mountable to a support frame. The individual screen panels can be constructed of a frame or insert that is encapsulated by a resilient material, such as a polymeric material, such as polyurethane or rubber. The individual screen panels can be mounted to the support frame and subjected to intense vibrations during the screening process. As materials are passed over the surface of the screen panels, desired materials pass through the apertures of the screen panels.

BRIEF DESCRIPTION OF THE DRAWINGS

Detailed discussion of embodiments directed to one of ordinary skill in the art are set forth in the specification, which makes reference to the appended figures, in which.

SUMMARY

Figure 1:
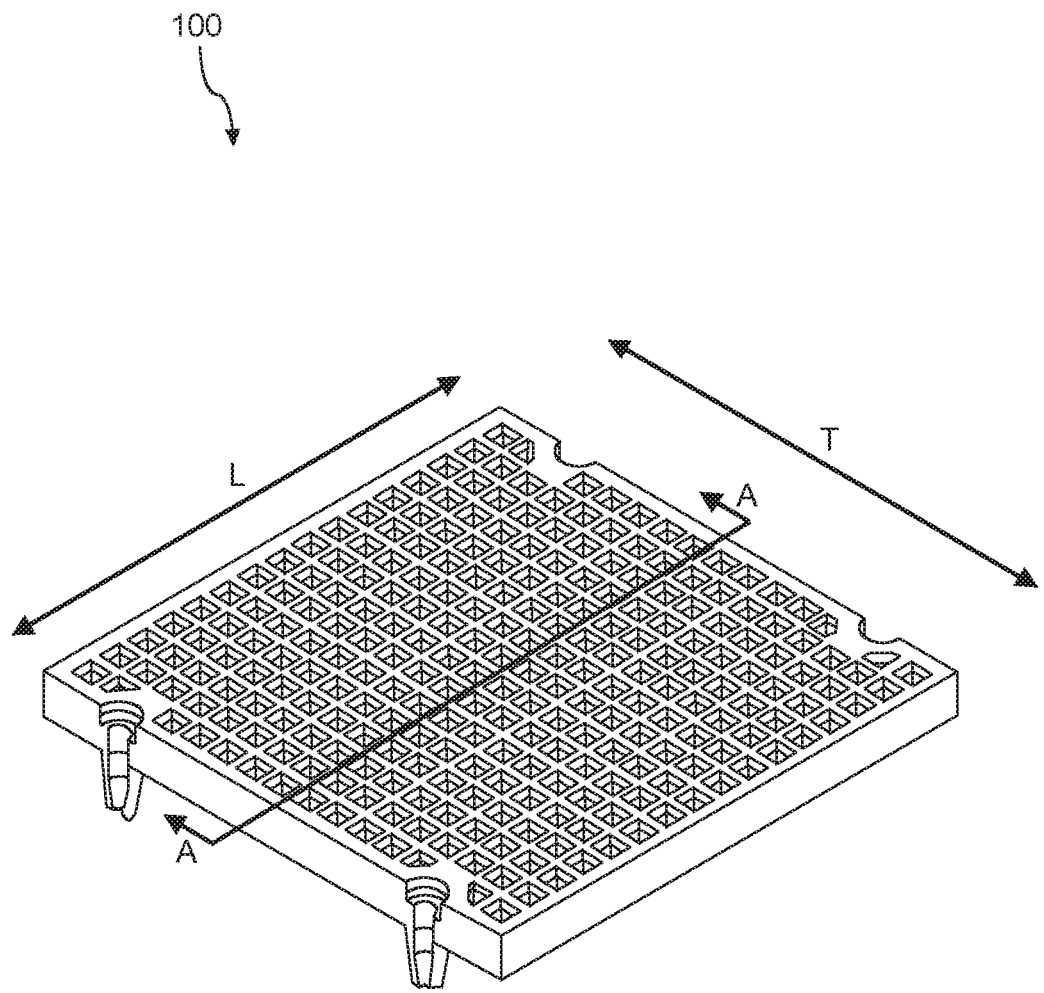
FIG. 1 depicts a screen panel according to example embodiments of the present disclosure.
Figure 2:
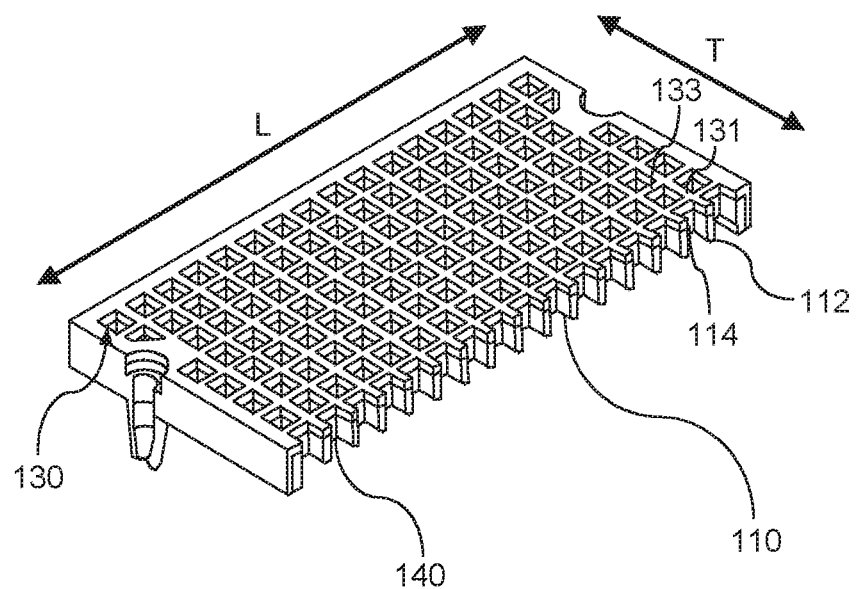
FIG. 2 depicts a cutaway view taken along section line A-A of FIG. 1 according to example embodiments of the present disclosure.

One example aspect of the present disclosure is directed to a screen panel for a vibratory machine can include a reinforcing structure having a top surface. The reinforcing structure can define a plurality of apertures through the reinforcing structure. The screen panel can include a polymer layer having a bottom surface that is arranged over the top surface of the reinforcing structure. The polymer layer can define a plurality of apertures therethrough. Each aperture of the plurality of apertures of the polymer layer can be aligned with a single respective aperture of the plurality of apertures of the reinforcing structure. The polymer layer can include a resilient material.

Another example aspect of the present disclosure is directed to a screening system for a vibratory machine. The screening system can include a first screen panel including a plurality of bridge elements that defines a plurality of apertures therethrough in a vertical direction. The first screen panel can have a plurality of edges. The first screen panel can have a plurality of partial bridge elements extending away from the first screen panel from at least one edge of the plurality of edges of the first screen panel in a lateral direction perpendicular to the vertical direction. A second screen panel can include a plurality of bridge elements that defines a plurality of apertures therethrough in a vertical direction, the second screen panel having a plurality of edges, and wherein the second screen panel has a plurality of partial bridge elements extending away from the second screen from at least one edge of the plurality of edges in the lateral direction, each of the plurality of partial bridge elements of the second screen panel being aligned with respective ones of the plurality of partial bridge elements of the first screen panel to form at least one aperture in the vertical direction at an intersection of the first screen panel and the second screen panel.

Another example aspect of the present disclosure is directed to a screen panel for a vibratory machine. The screen panel can include a reinforcing structure including a first plurality of bridge elements having respective top surfaces and a second plurality of bridge elements having respective top surfaces. The second plurality of bridge elements can intersect the first plurality of bridge elements to define a plurality of apertures. A polymer layer can define a plurality of apertures therethrough. The polymer layer can be arranged over the reinforcing structure such that the polymer layer covers all respective top surfaces of the first plurality of bridge elements and covers all respective top surfaces of the second plurality of bridge elements.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to screen panels for use in screening systems. Screen panels for screening systems, in some cases, have a need to be strong and long-lasting. Conventional screen panels for screening systems can include a frame formed from a structural material, such as metals or polymer composites. Furthermore, the frame can be surrounded by a wear resistant polymer layer. The wear resistant polymer layer can cover the frame and form bridges that define screening apertures. Over the years, screen panels have evolved to have more open area. However, the requirement that screen panels be both strong and long-lasting can limit an amount of space available for the screening apertures.

Example aspects of the present disclosure are directed to a screen panel for a vibratory machine. The screen panel can include a reinforcing structure having a top surface. The reinforcing structure can define a plurality of apertures through the reinforcing structure. The screen panel can include a polymer layer having a bottom surface that is arranged over the top surface of the reinforcing structure. The polymer layer can define a plurality of apertures therethrough. Each aperture of the plurality of apertures of the polymer layer can be aligned with a single respective aperture of the plurality of apertures of the reinforcing structure. In some embodiments, the polymer layer can include a resilient material.

The reinforcing polymer structure can include a first plurality of bridge elements and a second plurality of bridge elements. The first plurality of bridge elements and the second plurality of bridge elements can intersect one another to define a plurality of openings. The screen panels can further include a wear resistant polymer material formed from a second material that is different than the first material. The wear resistant polymer layer can at least partially cover the reinforcing polymer structure. For instance, the wear resistant polymer layer can cover a top portion of the reinforcing polymer structure. More specifically, the wear resistant polymer layer can cover a top surface of both the first plurality of bridge elements and the second plurality of bridge elements, respectively. Furthermore, each of a plurality of screening apertures defined by the wear resistant polymer material can be aligned with a corresponding opening of the plurality of openings defined by the reinforcing polymer structure.

In some embodiments, the polymer layer can cover all of the top surface of the reinforcing structure.

In some embodiments, the reinforcing structure can include a first group of bridge elements elongated along a transverse direction and spaced apart from one another along a lateral direction; and a second group of bridge elements elongated along the lateral direction and spaced apart from one another along the transverse direction. The first group of bridge elements and the second group of bridge elements can define respective perimeters of the reinforcing structure along the top surface of the reinforcing structure. The polymer layer can cover all respective portions of the top surface of the reinforcing structure located on each bridge element of the first group of bridge elements and covers all respective portions of the top surface of the reinforcing structure located on each bridge element of the second group of bridge elements.

In some embodiments, the reinforcing structure can be bonded to the polymer layer along respective portions of the top surface of the reinforcing structure that are located on each bridge element of the first group of bridge elements; and the reinforcing structure can be bonded to the polymer layer along respective portions of the top surface of the reinforcing structure that are located on each bridge element of the second group of bridge elements.

In some embodiments, the reinforcing structure can be bonded to the polymer layer. Example bonding processes can include mechanical adhesion, dispersive adhesion (e.g., Van Der Waals Forces), electrostatic adhesion, specific adhesion (e.g., hydrogen bonding), chemical adhesion (e.g., ionic or covalent bonding), diffusion adhesion (e.g., interdiffusion, entanglement, intermingling, or physical cross-linking). As additional examples an adhesive material can be used to bond the reinforcing structure to the polymer layer. As further examples, the reinforcing structure can be overmolded, printed, or otherwise deposited or formed on the polymer layer.

The reinforcing structure can include a variety of materials. In some embodiments, the reinforcing structure can include at least one of polyethylene, polypropylene, polyamide, acrylonitrile butadiene styrene (ABS), polycarbonate, polybutylene terephthalate (PBT), polyester, resin, or a blend thereof. In some embodiments, the reinforcing structure can include at least one of glass fiber or carbon fiber.

In some embodiments, the resilient material of the polymer layer can include at least one of a urethane elastomer or a vulcanized rubber.

Example aspects of the present disclosure are directed to a screening system for a vibratory machine. The screening system can include a first screen panel comprising a plurality of bridge elements that defines a plurality of apertures therethrough in a vertical direction. The first screen panel can have a plurality of edges. The first screen panel can have a plurality of partial bridge elements extending away from the first screen panel from at least one edge of the plurality of edges of the first screen panel in a lateral direction perpendicular to the vertical direction. A second screen panel can include a plurality of bridge elements that defines a plurality of apertures therethrough in a vertical direction. The second screen panel can have a plurality of edges. The second screen panel can have a plurality of partial bridge elements extending away from the second screen from at least one edge of the plurality of edges in the lateral direction. Each of the plurality of partial bridge elements of the second screen panel can be aligned with respective ones of the plurality of partial bridge elements of the first screen panel to form at least one aperture in the vertical direction at an intersection of the first screen panel and the second screen panel.

In some embodiments, respective end faces of the plurality of partial bridge elements of the second screen panel can contact respective end faces of respective ones of the plurality of partial bridge elements of the first screen panel.

In some embodiments, each of the plurality of partial bridge elements of the second screen panel are aligned with respective ones of the plurality of partial bridge elements of the first screen panel such that the at least one aperture includes a plurality of apertures at the intersection of the first screen panel and the second screen panel.

In some embodiments, the first screen panel can include an additional plurality of partial bridge elements extending away from the first screen panel in a transverse direction from an additional edge of the plurality of edges. The transverse direction can be perpendicular to each of the lateral direction and a vertical direction.

In some embodiments, the additional edge of the plurality of edges of the first screen panel can be parallel and opposite to the at least one edge of the plurality of edges of the first screen panel.

In some embodiments, the plurality of partial bridge elements of the first screen panel define a portion of a perimeter of the first screen panel when viewed from the vertical direction.

In some embodiments, the plurality of partial bridge elements of the second screen panel can define a portion of a perimeter of the second screen panel when viewed from the vertical direction.

In some embodiments, at least one of the first screen panel or the second screen panel can include a frame member extending in a transverse direction. The transverse direction can be perpendicular to each of the lateral direction and a vertical direction. Each of the plurality of partial bridge elements of the first screen panel can extend downward in the vertical direction away from a top surface of the first screen panel and connect with the frame member to form at least one lateral aperture at the intersection of the first screen panel and the second screen panel. The lateral aperture(s) can extend in the lateral direction.

In some embodiments, a support structure can be arranged below the first screen panel and second screen panel in the vertical direction. The frame member can contact the support structure to support the first screen panel and second screen panel.

In some embodiments, each of the first screen panel and the second screen panel can include respective frame members extending in the transverse direction. The respective frame members can be aligned in the lateral and transverse directions.

In some embodiments, each of the plurality of partial bridge elements of the first screen panel extend downward in the vertical direction away from a top surface of the first screen panel and connect with the frame member of the first screen panel to define at least one lateral aperture at the intersection of the first screen panel and the second screen panel. The lateral aperture(s) can extend in the lateral direction. Each of the plurality of partial bridge elements of the second screen panel extend downward in the vertical direction away from a top surface of the second screen panel and connect with the frame member of the second screen panel.

In some embodiments, at least one of the first screen panel or the second screen panel can include a reinforcing structure having a top surface. The reinforcing structure can define a plurality of apertures through the reinforcing structure. A polymer layer can have a bottom surface that is arranged over the top surface of the reinforcing structure. The polymer layer can defines a plurality of apertures therethrough. Each aperture of the plurality of apertures of the polymer layer can be aligned with a single respective aperture of the plurality of apertures of the reinforcing structure. The polymer layer can include a resilient material.

Example aspects of the present disclosure are directed to a screen panel for a vibratory machine. The screen panel can include a reinforcing structure including a first plurality of bridge elements having respective top surfaces and a second plurality of bridge elements having respective top surfaces. The second plurality of bridge elements can intersect the first plurality of bridge elements to define a plurality of apertures. A polymer layer can define a plurality of apertures therethrough. The polymer can be arranged over the reinforcing structure such that the polymer layer covers all respective top surfaces of the first plurality of bridge elements and covers all respective top surfaces of the second plurality of bridge elements.

The first material used to form the reinforcing polymer structure can include any suitable type of polymer having a sufficiently high tensile strength or flexural modulus. For instance, the polymer can include, without limitation, polyethylene, polypropylene, polyamide, acrylonitrile butadiene styrene (ABS), polycarbonate, polybutylene terephthalate (PBT), or polyester. In some implementations, the first material can be a neat resin. Alternatively, the first material can include a blend of polymers.

The second material used to form the wear resistant polymer layer can include any suitable type of polymer known to resist wear imparted by the materials being screened, such as abrasive wear and erosive wear. Polymers having such properties can be elastomeric with relatively low modulus values, high elongation capacity, and high resistance to tearing. Example polymers can include urethane elastomers or vulcanized rubbers.

In some implementations, the first material used to form the reinforcing polymer structure can include one or more reinforcements, fillers, and/or additives. Example reinforcements include fibers such as glass fiber, carbon fiber, or aramid fiber. Fillers can include calcium carbonate, silica, coal fly ash, or other common materials. Additives may include materials designed to enhance the bonding of the reinforcement to the wear resistant polymer material. In some implementations, the one or more fillers can be processed via any suitable type of injection molding process.

In some implementations, the wear resistant polymer layer can be bonded to the upper portion of the reinforcing polymer structure. More specifically, the wear resistant layer can be bonded to the top surface of both the first plurality of bridge elements and the second plurality of bridge elements, respectively. In this manner, the wear resistant polymer layer covering the top portion of the reinforcing polymer structure can define the size and shape of the plurality of screening apertures of the screen panel. In addition, the wear resistant polymer layer can protect the top portion of the reinforcing polymer structure from wear (e.g., abrasive wear, erosive wear).

In some implementations, the wear resistant polymer layer can also cover the bottom portion of the reinforcing polymer structure. In this manner, the wear resistant polymer layer can also protect the bottom portion of the reinforcing polymer structure from wear. Alternatively or additionally, the wear resistant polymer layer can cover one or more sides of the reinforcing polymer structure extending between the upper portion and the bottom portion. In this manner, the wear resistant polymer layer can also protect the one or more sides of the reinforcing polymer structure from wear.

In some implementations, the wear resistant polymer layer can include one or more fasteners. In such implementations, the screen panel can be attached to a support frame via the one or more fasteners. Alternatively or additionally, the reinforcing polymer structure can span between support frame members of a screen deck. In this manner, the reinforcing polymer structure can provide support for the screen panel. In addition, the reinforcing polymer structure provides support for the wear resistant polymer layer.

Example screen panels of the present disclosure can provide numerous technical benefits. For instance, as discussed above, the wear resistant polymer layer can be bonded to the upper portion of the reinforcing polymer structure. In this manner, each of the plurality of bridges of the screen panels can include the first material used to form the reinforcing polymer structure and the second material used to form the wear resistant polymer layer. In this manner, the dimensions (e.g., width, thickness, etc.) of each of the plurality of bridge elements can be reduced, because the strength and stiffness of each bridge is improved via the first material. Furthermore, the reinforcing polymer structure allows the overall panel loads to be carried without requiring additional components (e.g., support frames). In this manner, an amount of space on the screen panel that can be used for screening can be increased. This enables higher throughput of material through a given screen panel. Another added benefit is that the weight of the screen panel can be reduced due, at least in part, to the reinforcing polymer structure weighing less than frames used in conventional screen panels. In this manner, the weight added by screen panels of the present disclosure place on a vibratory screening machine can be reduced compared to conventional screen panels.

Example aspects of the present disclosure are directed to modular screen panels for screening systems. Conventional modular screen panels do not provide as much open area or as many screening apertures as other conventional screening media (e.g., wire cloth). This is due to the fact that a portion of the open area is occupied by fasteners configured to couple the screen panel to a screen deck of the screening system. Although changes have been implemented to reduce the amount of space these fasteners, a portion of the open area remains occupied by the fasteners.

Example aspects of the present disclosure can include a modular screen panel having a screening surface that is elevated relative to a screen deck of a screening system. For instance, in some implementations, a plurality of bridge elements defining, at least in part, a plurality of screening apertures in the screening surface can extend from the screening surface and connect to the screen deck. In this manner, the modular screen panel can be coupled to the screen deck without consuming any additional platform area from the screening surface of the modular screen panel.

In some implementations, the plurality of bridge elements extending from the screening surface to connect to the screen deck can include projections or features configured to engage a corresponding projection or features associated with the screen deck. Alternatively or additionally, the plurality of screening apertures can extend from the screening surface such that the screening surface is elevated relative to the screen deck by a predetermined amount. For instance, in some implementations, the predetermined amount can correspond to a minimum dimension of the plurality of screening apertures.

In some implementations, the modular screen panel can be a borderless screen panel. More specifically, the perimeter of the modular screen panel can be defined by the plurality of bridge elements. When mounted on the support deck, the plurality of bridge elements of the modular screen panel can connect to corresponding bridge elements of adjacent panels to define additional screening apertures. In this manner, the number of screening apertures of the modular screening panel can be increased, because the perimeter of the modular screening panel is no longer occupied by the fastener(s).

In some embodiments, perpendicular edges of the same screen panel can define partial bridge elements such that apertures are formed between the screen panel and multiple other screen panels. For example, the first screen panel can include an additional plurality of partial bridge elements extending away from the first screen panel in a transverse direction from an additional edge of the plurality of edges. The transverse direction can be perpendicular to each of the lateral direction and a vertical direction. A third screen panel can include a plurality of partial bridge elements aligned with respective ones of the additional plurality of partial bridge elements of the first screen panel to form at least one aperture in the vertical direction at an intersection of the first screen panel and the third screen panel.

In some implementations, the modular screen panel can define a plurality of apertures oriented in a plane that is substantially perpendicular to the additional screening apertures. For instance, in some implementations, the additional screening apertures can be oriented in a plane that is substantially perpendicular to a vertical direction, whereas the plurality of apertures can be oriented in a plane that is substantially parallel to the vertical direction. In this manner, material flowing through a corresponding aperture of the plurality of additional screening apertures can flow into the screen deck via a corresponding aperture of the plurality of apertures oriented in a plane that is substantially perpendicular to the plurality of additional screening apertures. In this manner, accumulation of material on the plurality of bridges extending from the screening surface can be prevented.

Referring now to FIGS. 1-4 depict an example screen panel 100 according to example embodiments of the present disclosure. The screen panel 100 can define a coordinate system that includes a lateral direction L, a transverse direction T, and a vertical direction V. The screen panel 100 can include a reinforcing polymer structure 110. In some implementations, the reinforcing polymer structure 110 can include a first group of bridge elements 112 extending along the transverse direction T and spaced apart from one another along the lateral direction L. Additionally, the reinforcing polymer structure 110 can include a second group of bridge elements 114 extending along the lateral direction L and spaced apart from one another along the transverse direction T. As shown, the first plurality of bridge elements 112 and the second plurality of bridge elements 114 can intersect with one another to define a plurality of openings. Although the reinforcing polymer structure 110 is depicted as having a rectangular shape, it should be appreciated that the reinforcing polymer structure 110 can be configured to have any suitable shape.

In some implementations, the reinforcing polymer structure 110 can be formed from any suitable type of polymer having a sufficiently high tensile strength or flexural modulus. In this manner, the stiffness and strength of both the first plurality of bridge elements 112 and the second plurality of bridge elements 114 can be improved. As a result, the dimensions (e.g. width) of the first plurality of bridge elements 112 and the second plurality of bridge elements 114 can be reduced.

As shown, the screen panel 100 can include a wear resistant polymer layer 130 bonded to the reinforcing polymer structure 110 such that the wear resistant polymer layer 130 at least partially covers the reinforcing polymer structure 110. For instance, in some implementations, the wear resistant polymer layer 130 can be bonded to a top portion of the reinforcing polymer structure 110. More specifically, the wear resistant polymer layer 130 can be bonded to a top surface of each of the first plurality of bridge elements 112. In addition, the wear resistant polymer layer 130 can be bonded to a top surface of each of the second plurality of bridge elements 114. As shown, the wear resistant polymer layer 130 can define a plurality of screening apertures 132. Each of the plurality of screening apertures 132 can be aligned with a corresponding opening of the plurality of openings 144 defined by the reinforcing polymer structure 110. It should be appreciated that a size and shape of the plurality of screening apertures 132 can be defined by the wear resistant polymer layer 130.

In some implementations, the wear resistant polymer layer 130 can also be bonded to the bottom portion of the reinforcing polymer structure 110. Alternatively or additionally, the wear resistant polymer layer 130 can be bonded to one or more sides of the reinforcing polymer structure 110 extending along the vertical direction V between the bottom portion and the top portion.

It should be understood that the wear resistant polymer layer 130 can be bonded to the reinforcing polymer structure 110 using any suitable bonding process. Example bonding processes can include mechanical adhesion, dispersive adhesion (e.g., Van Der Waals Forces), electrostatic adhesion, specific adhesion (e.g., hydrogen bonding), chemical adhesion (e.g., ionic or covalent bonding), diffusion adhesion (e.g., interdiffusion, entanglement, intermingling, or physical crosslinking). In some implementations, the reinforcing polymer structure 110 can be treated with a primer or bonding agent to facilitate bonding with the wear resistant polymer layer 130. Furthermore, the reinforcing polymer structure can be subjected to flame treatment, corona treatment, or plasma treatment to enhance bonding with the wear resistant polymer.

It should be understood that the wear resistant polymer layer can be formed from any suitable type of polymer known to resist wear imparted by the material being screened, such as abrasive wear and erosive wear. Polymers having such properties can be elastomeric with relatively low modulus values, high elongation capacity, and high resistant to tearing. Example polymers can include urethane elastomers or vulcanized rubbers. It should also be understood that one or more materials from which the wear resistant polymer layer 130 is formed are different than one or more materials from which the reinforcing polymer structure 110 is formed.

In some implementations, the wear resistant polymer layer 130 can define one or more fastener features 140. The one or more fastener features 140 can be used to secure the screen panel 100 to a support frame associated with a screening system. In this manner, the screen panel 100 can be secured to the support frame without requiring one or more additional components.

Figure 3:
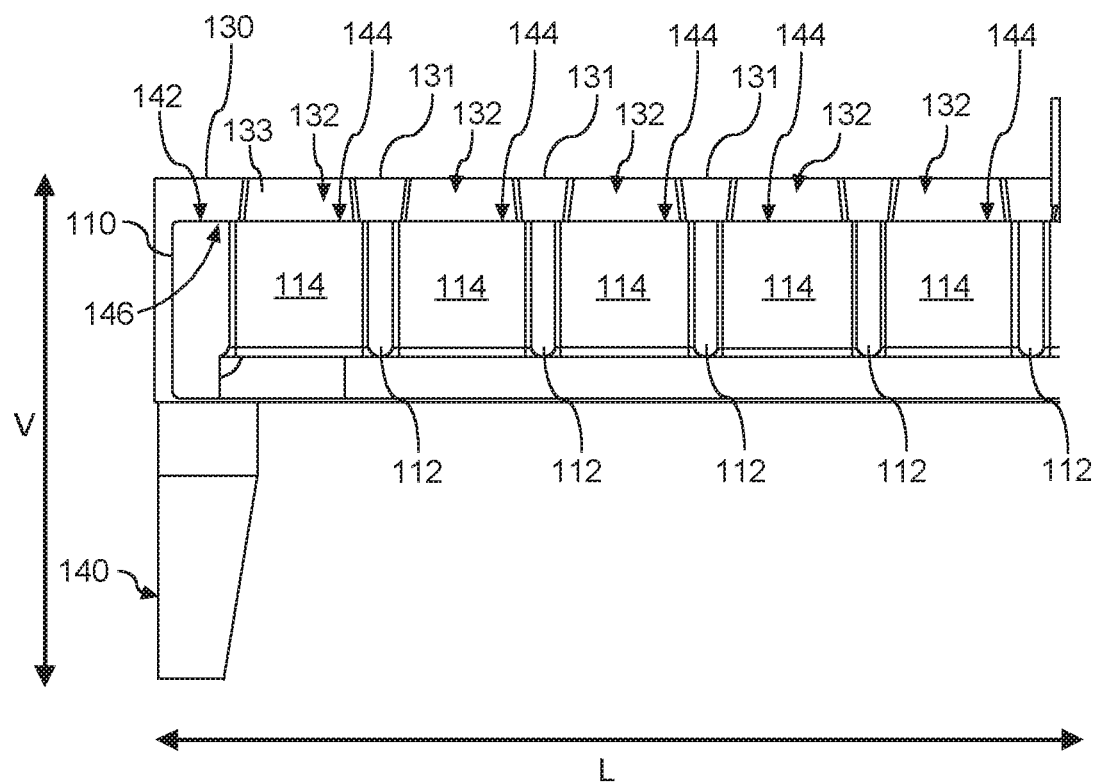
FIG. 3 depicts a cross-sectional view of a screen panel according to example embodiments of the present disclosure.
Figure 4:
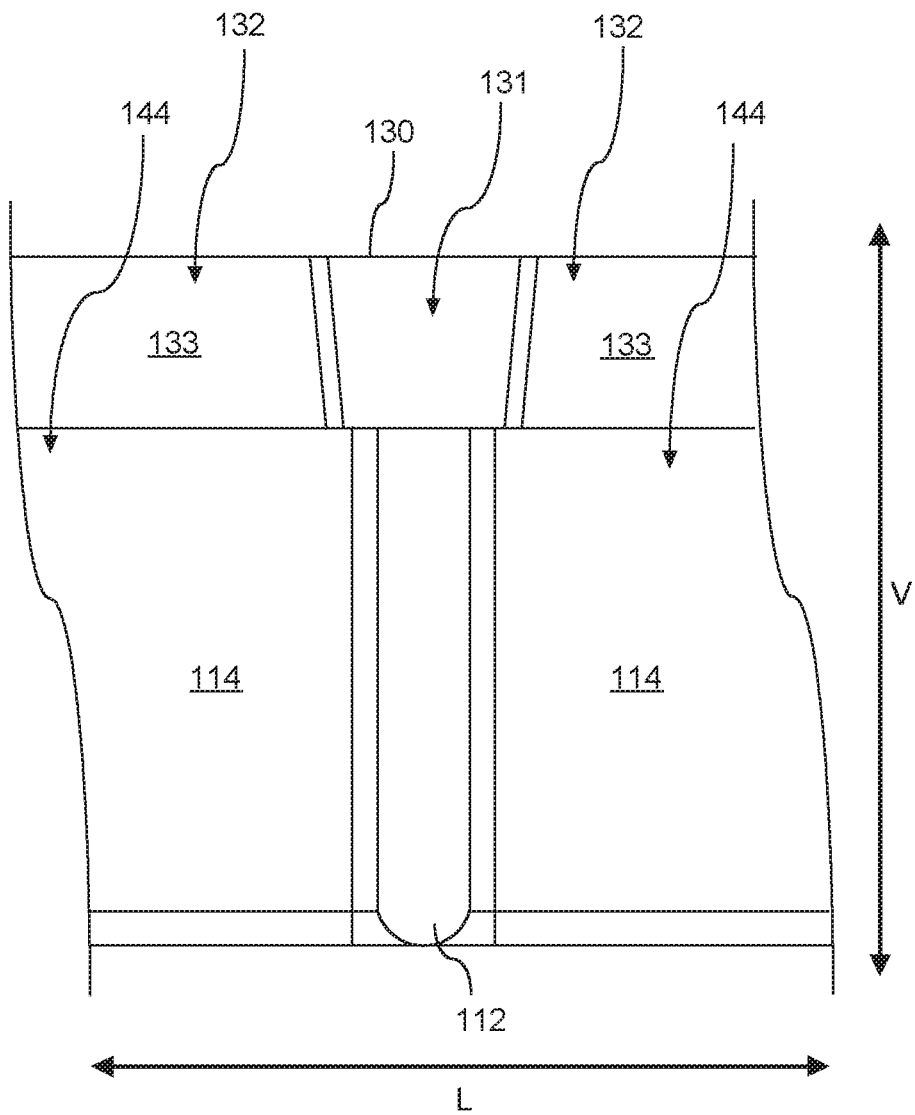
FIG. 4 depicts another cross-sectional view of a screen panel according to example embodiments of the present disclosure.

Referring to FIG. 3, the reinforcing structure 110 can have a top surface 142. The reinforcing structure 110 can define a plurality of apertures 144 through the reinforcing structure 110. The polymer layer 130 can have a bottom surface 146 that is arranged over the top surface 142 of the reinforcing structure 110. As indicated above, the polymer layer 130 can define a plurality of opening 132 or apertures therethrough. For example, the polymer layer 130 can include a first group of bridge elements 131 extending in the Transverse direction and a second group of bridge elements 133 extending in the Lateral direction. The first group of bridge elements 131 and second group of bridge elements 133 can define the apertures 132 of the polymer layer 130.

Each aperture 132 of the polymer layer 130 can be aligned with a single respective aperture 144 of the reinforcing structure 110. For example, the polymer layer 130 can cover all of the top surface 142 of the reinforcing structure 110. For example, the polymer layer 130 can cover all respective portions of the top surface 142 of the reinforcing structure 110 that are located on each bridge element 112 of the first group of bridge elements 112 and can cover all respective portions of the top surface 142 of the reinforcing structure located on each bridge element 114 of the second group of bridge elements 114. The reinforcing structure 110 can be bonded to the polymer layer 130 along respective portions of the top surface 142 of the reinforcing structure 110 that are located on each bridge element 112 of the first group of bridge elements 112.

In some embodiments, the reinforcing structure 110 can be bonded to the polymer layer 130. For example, the reinforcing structure 110 can be bonded to the polymer layer 130 along respective portions of the top surface 142 of the reinforcing structure 110 that are located on each bridge element 114 of the second group of bridge elements 114. However, in other embodiments the reinforcing structure 110 can be bonded to the polymer layer 130 along less than all of the top surface 142 of the reinforcing structure 110.

Figure 5:
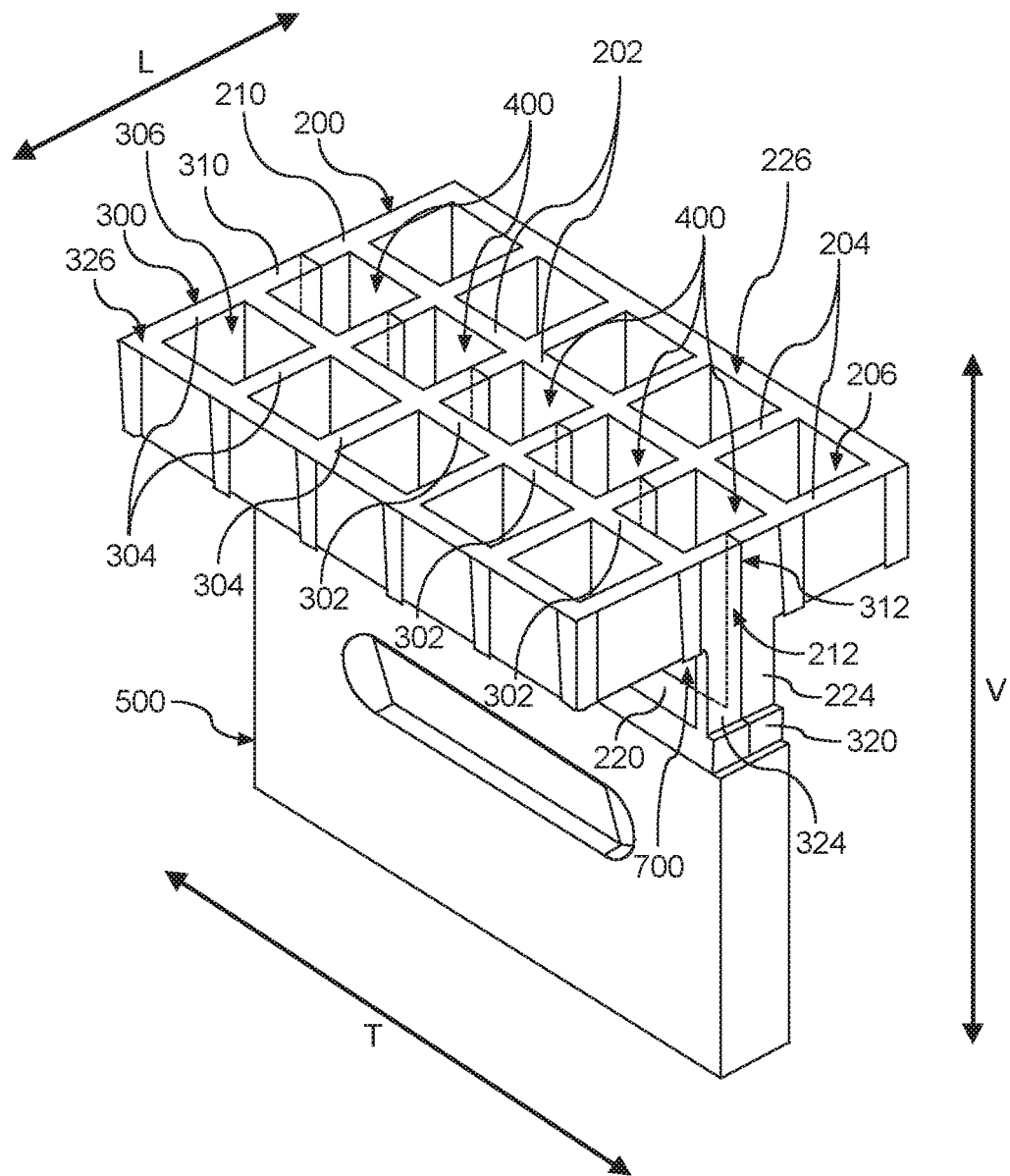
FIG. 5 depicts a partial view of a first screen panel and a second screen panel of a screening system according to example embodiments of the present disclosure.
Figure 6:
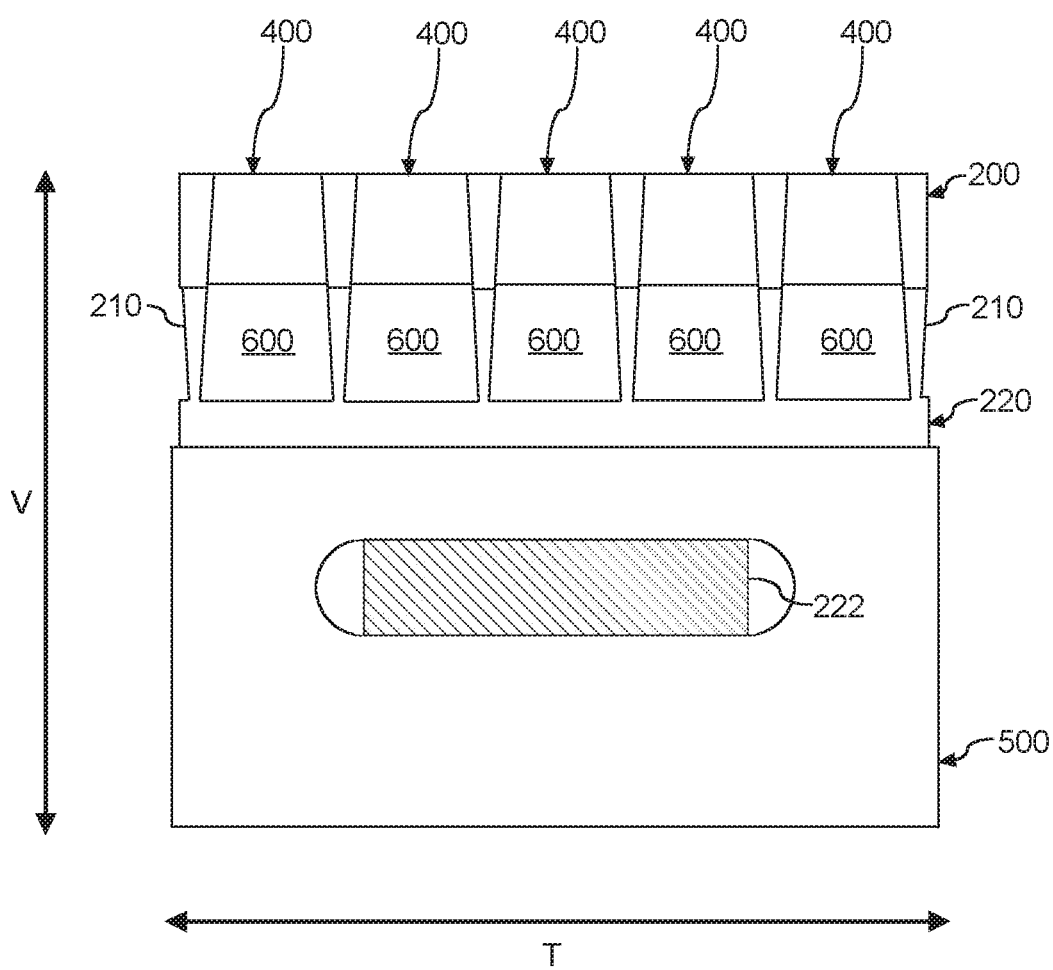
FIG. 6 depicts side view of a screen panel of a screening system according to example embodiments of the present disclosure.
Figure 7:
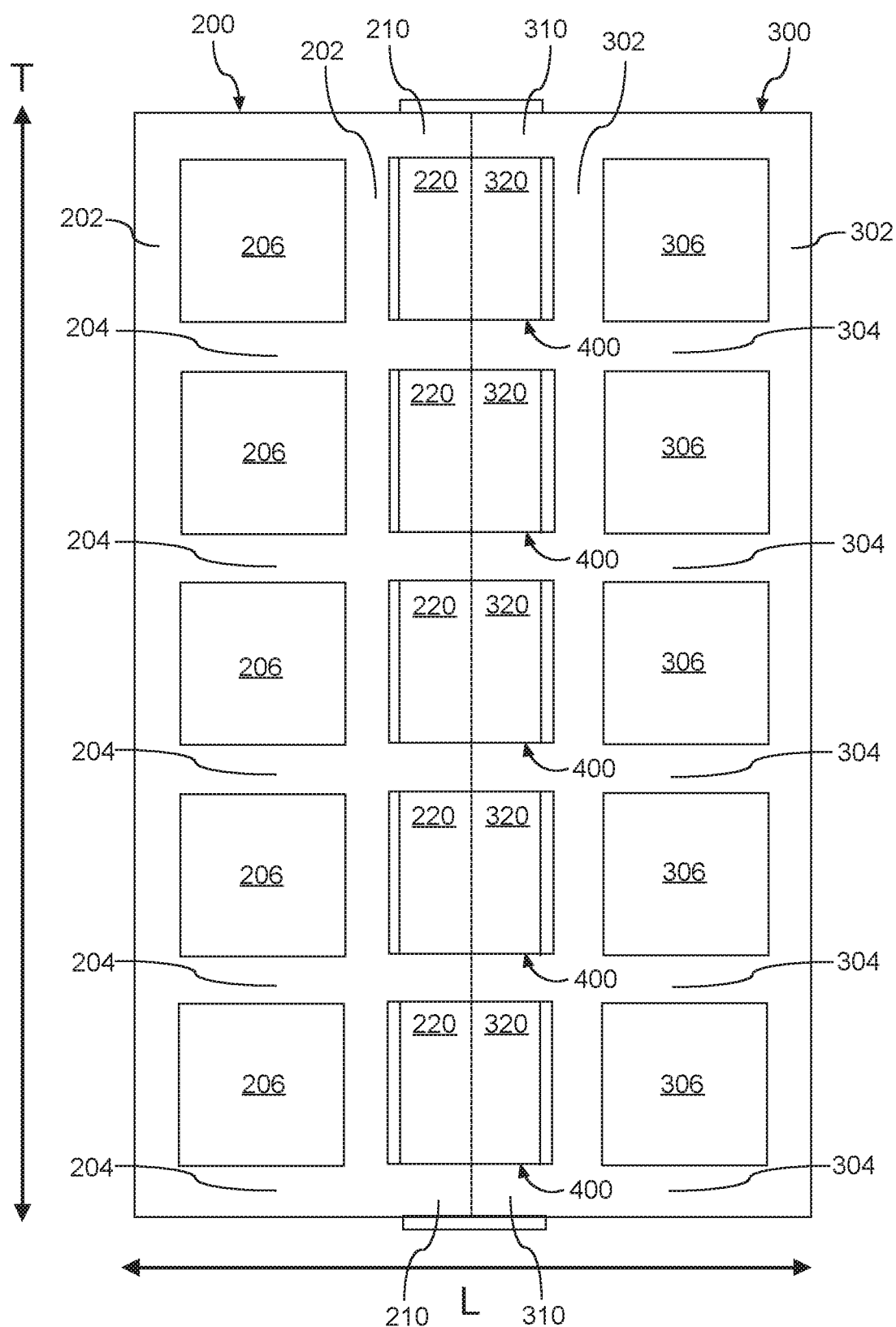
FIG. 7 depicts top view of a screen panel of a screening system according to example embodiments of the present disclosure.

Referring now to FIGS. 5 through 7, a first screen panel 200 and a second screen panel 300 of a screening system are provided according to example embodiments of the present disclosure. The first screen panel 200 and the second screen panel 300 can each define a coordinate system including a lateral direction L, a transverse direction T, and a vertical direction V. As shown, the first screen panel 200 and the second screen panel 300 can each define a first group of bridge elements 202, 302 extending along the transverse direction T and spaced apart from one another along the lateral direction L. Additionally, the first screen panel 200 and the second screen panel 300 can each define a second group of bridge elements 204, 304 extending along the lateral direction L and spaced apart from one another along the transverse direction T. As shown, the first plurality of bridge elements 202, 302 and the second plurality of bridge elements 204, 304 can intersect with one another to define a plurality of screening apertures 206, 306 in the vertical direction, V.

In some implementations, the first screen panel 200 can include a plurality of partial bridge elements 210 extending away from the first screen panel 200 in the lateral direction L. For example, the plurality of partial bridge elements 210 can extend from a corresponding bridge element of the second group of bridge elements 204. Additionally, the plurality of partial bridge elements 210 can be spaced apart from one another along the transverse direction T. Furthermore, although the plurality of partial bridge elements 210 are depicted as defining only one side of the first screen panel 200, it should be understood that each of the remaining sides of the first screen panel 200 can be defined by the plurality of partial bridge elements 210. In this manner, the first screen panel 200 can be a borderless screen panel having a perimeter that is defined by the plurality of partial bridge elements 210.

In some implementations, the second screen panel 300 can include a plurality of partial bridge elements 310 extending away from the second screen panel 300 in the lateral direction L, For example, the plurality of partial bridge elements 310 can extend from respective corresponding bridge elements of the second group of bridge elements 304. Additionally, the plurality of partial bridge elements 310 can be spaced apart from one another along the transverse direction T. Furthermore, although the plurality of partial bridge elements 310 are only depicted as defining one side of the second screen panel 300, it should be understood that some or all of the remaining sides of the second screen panel 300 can be defined by the plurality of partial bridge elements 310. In this manner, the second screen panel 300 can be a borderless screen panel having a perimeter that is defined by the plurality of partial bridge elements 310. As will be discussed below in more detail, the first screen panel 200 and the second screen panel 300 can be positioned relative to one another such that each of the plurality of partial bridge elements 210 of the first screen panel 200 contacts (e.g., touches) a corresponding partial bridge element of the plurality of partial bridge elements 310 of the second screen panel 300. For example, respective end faces 312 of the plurality of partial bridge elements 310 of the second screen panel 300 can contact respective end faces 212 of respective ones of the plurality of partial bridge elements 210 of the first screen panel 200. Each of the plurality of partial bridge elements 310 of the second screen panel 300 can be aligned with respective ones of the plurality of partial bridge elements 210 of the first screen panel 200 such that a plurality of apertures 400 are formed at the intersection of the first screen panel 200 and the second screen panel 300.

The plurality of partial bridge elements 210, 310 of the first screen panel 200 and the second screen panel 300, respectively, define one or more screening apertures 400 an intersection of the first screen panel 200 and the second screen panel 300. In this manner, the first screen panel 200 and the second screen panel 300 can have the appearance of a single screen panel (e.g., along an intersection of the first screen panel 200 and the second screen panel 300).

As shown, each of the plurality of screening apertures 400 can be defined along the lateral direction L between a corresponding bridge element of the second group of bridge elements 204, 304 of the first panel 200 and the second panel 300, respectively. Each of the plurality of screening apertures 400 can be further defined along the transverse direction T between adjacent partial bridge elements 210, 310 of the plurality of partial bridge elements 210, 310 of the first screen panel 200 and the second screen panel 300, respectively.

For instance, perpendicular edges of the same screen panel can define partial bridge elements such that apertures are formed between the screen panel and multiple other screen panels. For example, the first screen panel can include an additional plurality of partial bridge elements extending away from the first screen panel in a transverse direction from an additional edge of the plurality of edges. The transverse direction can be perpendicular to each of the lateral direction and a vertical direction. A third screen panel can include a plurality of partial bridge elements aligned with respective ones of the additional plurality of partial bridge elements of the first screen panel to form at least one aperture in the vertical direction at an intersection of the first screen panel and the third screen panel.

Referring to FIG. 7, the plurality of partial bridge elements 210 of the first screen panel 200 can define a portion of a perimeter of the first screen panel when viewed from the vertical direction V. The plurality of partial bridge elements 310 of the second screen panel 300 can define a portion of a perimeter of the second screen panel 300 when viewed from the vertical direction.

Referring to FIGS. 5-7, in some embodiments, the first screen panel 200 or the second screen panel 300 can include a frame member 220 configured to support the first screen panel 200 and/or the second panel 300 at the intersection of the first screen panel 200 and second screen panel 300. The frame member 220 may be configured to support the first screen panel 200 and/or the second screen panel 300 in a manner that does not block the apertures 400 at the intersection of the first screen panel 200 and the second screen panel 300. Rather, the first screen panel 200 and second screen panel 300 can be structured such that material particles can pass through the apertures 400 at the intersection of the first screen panel 200 and the second screen panel 300 in the vertical direction, V.

For example, in some implementations, each of the plurality of partial bridge elements 210 of the first screen panel 200 can extend along the vertical direction V to a frame member 220 of the first screen panel 200. Likewise, each of the plurality of partial bridge elements 310 of the second screen panel 300 can extend along the vertical direction V to a frame member 320 of the second screen panel 300. In some implementations, the frame member 220 of the first screen panel 200 and the frame member 320 of the second screen panel 300 can each be coupled to a support structure 500 (e.g., deck) of the screening system. For instance, in some implementations, the frame member 220 of the first screen panel 200 and the frame member 320 of the second screen panel 300 can each include a projection or feature 222, 322 configured to engage a corresponding projection or feature (not shown) of the support structure 500.

For example, referring to FIG. 5, some or all of the plurality of partial bridge elements 210 of the first screen panel 200 can include respective downward extending portions 224 that extend downward in the vertical direction away from a top surface 226 of the first screen panel 200 and connect with the frame member 220 to form one or more lateral apertures 600, 700 at the intersection of the first screen panel 200 and the second screen panel 300. Similarly, some or all of the partial bridge elements 310 of the second screen panel 300 can include respective downward extending portions 324 that extend downward in the vertical direction away from a top surface 326 of the first screen panel 200 and connect with the frame member 320 to form one or more lateral apertures 600, 700 at the intersection of the first screen panel 200 and the second screen panel 300. However, it should be understood that, in some embodiments only one of the first screen panel 200 and the second screen panel 300 can include downward extending portions. In such embodiments, the panel that does include downward extending portions can rest on the panel that does include such downward extending portions.

Referring to FIGS. 5-7, when the frame member 220 of first screen panel 200 and the frame member 320 of the second screen panel 300 are each coupled to the support structure 500, it should be appreciated that each of the plurality of screening apertures 400 defined, at least in part, by corresponding partial bridge elements 210, 310 of the first screen panel 200 and the second screen panel 300, respectively, are spaced apart from the support structure 500 along the vertical direction V. As will be discussed below in more detail, the first screen panel 200 and the second screen panel 300 can each define a plurality of apertures configured to allow material flowing through a corresponding screening aperture of the plurality of screening apertures 400 to flow into a deck (not shown) positioned below the first and second panels 200, 300 and defined, at least in part, by the support structure 500.

In some implementations, the first screen panel 200 and the second screen panel 300 can each define a plurality of lateral apertures 600, 700 oriented in a plane that is substantially perpendicular to a plane in which the plurality of screening apertures 400 defined by the plurality of partial bridge elements 210, 310 of the first screen panel 200 and the second screen panel 300, respectively, is oriented. For instance, the plurality of screening apertures 400 can be oriented in a plane that is substantially perpendicular to the vertical direction V. Conversely, the plurality of lateral apertures 600, 700 can be oriented in a plane that is substantially parallel to the vertical direction V.

As shown, each of the plurality of lateral apertures 600 of the first screen panel 200 can be defined along the vertical direction V between the frame member 220 and a corresponding bridge element of the second group of bridge elements 204. Furthermore, each of the plurality of lateral apertures 600 of the first screen panel 200 can be defined along the transverse direction T between adjacent partial bridge elements of the plurality of partial bridge elements 210 of the first screen panel 200. It should be appreciated that each of the plurality of apertures 700 of the second screen panel 300 can be defined along the vertical direction V between the frame member 320 and a corresponding bridge element of the second group of bridge elements 304. It should also be appreciated that each of the plurality of apertures 700 of the second screen panel 300 can be defined along the transverse direction T between adjacent partial bridge elements of the plurality of partial bridge elements 310 of the second screen panel 300. As such, material that flows through the one of the plurality of screening apertures 400 can flow into the screen deck (not shown) via a corresponding aperture of the plurality of lateral apertures 600, 700 defined by the first screen panel 200 and the second screen panel 300, respectively. In this manner, accumulation of the material on the frame member 220 of the first screen panel 200 or the frame member 320 of the second screen panel 300 can be avoided.

Figure 8:
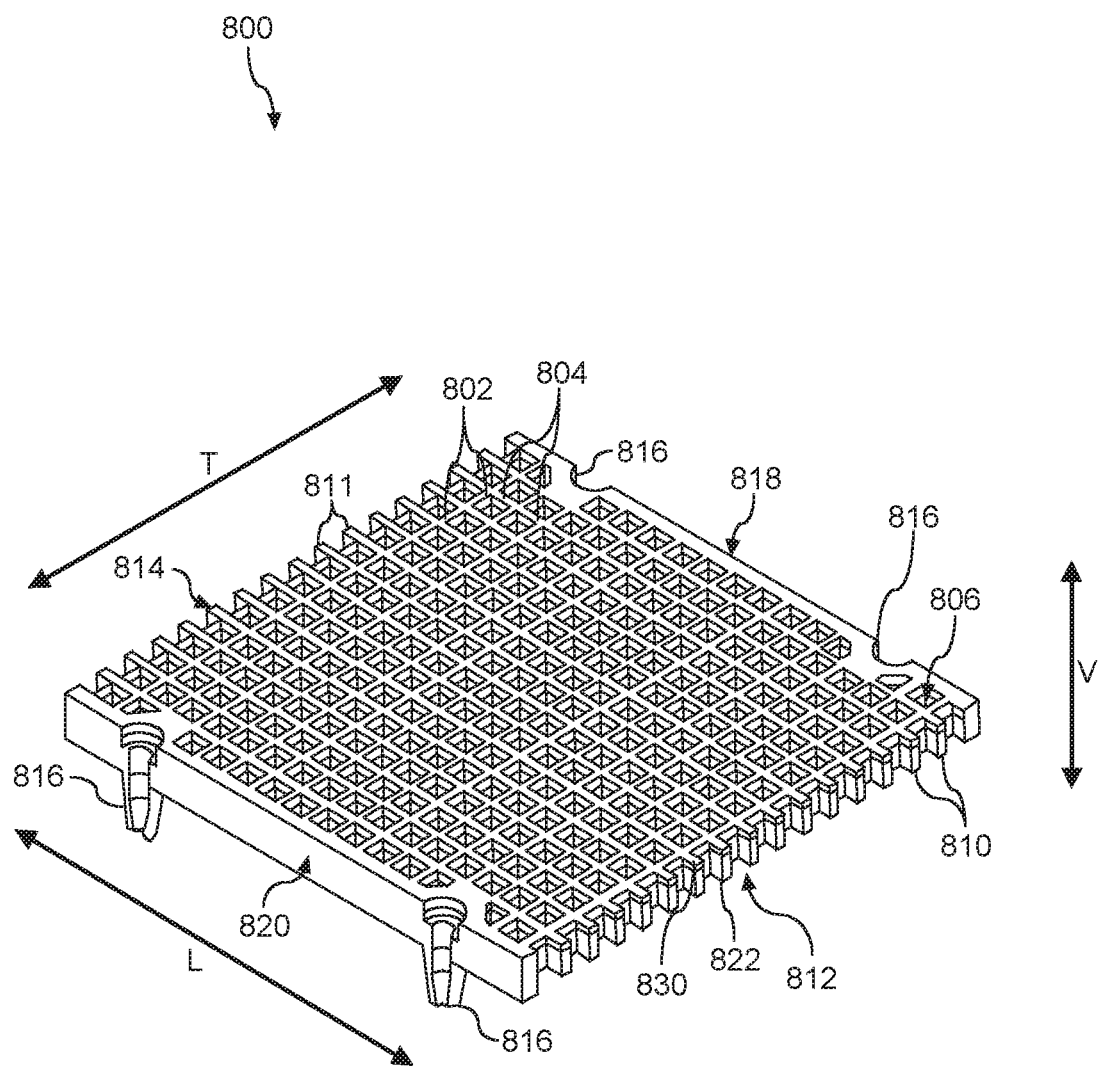
FIG. 8. Depicts another example screen panel of a screen system according to example embodiments of the present disclosure.

FIG. 8 illustrates an embodiment of screen panel 800 according to aspects of the present disclosure. The screen panel 800 can define a plurality of apertures 806 in the vertical direction. For example, the screen panel 800 can include a plurality of bridge elements 802 that are aligned with the Lateral direction and a plurality bridge elements 804 that are aligned with the Transverse direction to form the plurality of apertures 806. The screen panel 800 can include a first plurality of partial bridge elements 810 along a first edge 812 of the screen panel 800. The screen panel 800 can include a second plurality of partial bridge elements 811 along a second edge 814. The second edge 814 can be parallel with and opposite the first edge 812 such that a continuous strip of apertures 806 can be formed be arranged consecutive screening panels 800 adjacent each other, for example, in a manner described above with reference to FIGS. 5 through 7. However, it should be understood that, in other embodiments, the second edge 814 can be perpendicular to the first edge 812 or at any suitable angle. For example, the screen panel 800 can have a range of numbers of sides. For instance, the screen panel 800 can have three side or five or more sides (e.g., a honeycomb configuration). Thus, it should be understood that the screen panel 800 illustrated by FIG. 8 is merely an example embodiment according to aspects of the present disclosure.

The screen panel 800 can include one or more vertical support members 816 configured to support the screen panel 800. The vertical support members 816 can be disposed along one or more support edges 818, 820. For example, the support edges 818, 820 to which the vertical support members 816 are coupled can be distinct from the first and second edges 812, 814. For instance, the support edges 818, 820 can be perpendicular to one or both of the first edge 812 and the second edge 814. However, it should be understood that the screen panel can additionally or alternatively be supported along the first and second edges 812, 814, which include partial bridge members 810, 811, for example as described above with respect to the vertical portions 224, 324 and/or frame members 220, 320 of FIGS. 5 through 7.

In some embodiments, the screen panel 800 can include a reinforcing structure 822 having a top surface. The reinforcing structure 822 can define a plurality of apertures (corresponding with the apertures 806) through the reinforcing structure 822. The screen panel 800 can include a polymer layer 830 having a bottom surface that is arranged over the top surface of the reinforcing structure 822, for example as described above with respect to the top surface 142 of the reinforcing structure 110 and the bottom surface 146 of the polymer layer 130 of FIG. 1-4. The polymer layer 130 can cover the top surface of the reinforcing structure 822 and/or cover all respective top surfaces of bridge elements of the polymer layer 830, for example as described with respect to FIGS. 1-4. The polymer layer 830 can define a plurality of apertures therethrough (corresponding with apertures 806). Each aperture 806 of the polymer layer 830 can be aligned with a single respective aperture 806 of the reinforcing structure 822. While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A screening system for a vibratory machine, the screening system comprising:
a first screen panel comprising a plurality of bridge elements that defines a plurality of apertures therethrough in a vertical direction, the first screen panel having a plurality of edges, and wherein the first screen panel has a plurality of partial bridge elements extending away from the first screen panel from at least one edge of the plurality of edges of the first screen panel in a lateral direction perpendicular to the vertical direction, wherein the first screen panel is modular and removable from the screening system; and
a second screen panel comprising a plurality of bridge elements that defines a plurality of apertures therethrough in the vertical direction, the second screen panel having a plurality of edges, and wherein the second screen panel has a plurality of partial bridge elements extending away from the second screen from at least one edge of the plurality of edges in the lateral direction, each of the plurality of partial bridge elements of the second screen panel being aligned with respective ones of the plurality of partial bridge elements of the first screen panel to form at least one aperture in the vertical direction at an intersection of the first screen panel and the second screen panel, wherein the second screen panel is modular and removable from the screening system independently of the first screen panel.

2. The screening system of claim 1, wherein respective end faces of the plurality of partial bridge elements of the second screen panel contact respective end faces of respective ones of the plurality of partial bridge elements of the first screen panel.

3. The screening system of claim 1, wherein each of the plurality of partial bridge elements of the second screen panel are aligned with respective ones of the plurality of partial bridge elements of the first screen panel such that the at least one aperture includes a plurality of apertures at the intersection of the first screen panel and the second screen panel.

4. The screening system of claim 1, wherein the first screen panel comprises an additional plurality of partial bridge elements extending away from the first screen panel in a transverse direction from an additional edge of the plurality of edges, the transverse direction being perpendicular to each of the lateral direction and the vertical direction.

5. The screening system of claim 4, wherein the additional edge of the plurality of edges of the first screen panel is parallel and opposite to the at least one edge of the plurality of edges of the first screen panel.

6. The screening system of claim 1, wherein the plurality of partial bridge elements of the first screen panel define a portion of a perimeter of the first screen panel when viewed from the vertical direction.

7. The screening system of claim 1, wherein the plurality of partial bridge elements of the second screen panel define a portion of a perimeter of the second screen panel when viewed from the vertical direction.

8. The screening system of claim 1, wherein:
at least one of the first screen panel or the second screen panel comprises a frame member extending in a transverse direction, the transverse direction being perpendicular to each of the lateral direction and the vertical direction; and
each of the plurality of partial bridge elements of the first screen panel extend downward in the vertical direction away from a top surface of the first screen panel and connect with the frame member to form at least one lateral aperture at the intersection of the first screen panel and the second screen panel, the at least one lateral aperture extending in the lateral direction.

9. The screening system of claim 8, further comprising a support structure arranged below the first screen panel and second screen panel in the vertical direction, and wherein the frame member contacts the support structure to support the first screen panel and second screen panel.

10. The screening system of claim 1, wherein:
each of the first screen panel and the second screen panel comprise respective frame members extending in a transverse direction, the respective frame members aligned in the lateral and transverse directions;
each of the plurality of partial bridge elements of the first screen panel extend downward in the vertical direction away from a top surface of the first screen panel and connect with the frame member of the first screen panel to define at least one lateral aperture at the intersection of the first screen panel and the second screen panel, the at least one lateral aperture extending in the lateral direction; and
each of the plurality of partial bridge elements of the second screen panel extend downward in the vertical direction away from a top surface of the second screen panel and connect with the frame member of the second screen panel.

11. The screening system of claim 1, wherein at least one of the first screen panel or the second screen panel comprises:
a reinforcing structure having a top surface, the reinforcing structure defining a plurality of apertures through the reinforcing structure; and
a polymer layer having a bottom surface that is arranged over the top surface of the reinforcing structure, wherein the polymer layer defines a plurality of apertures therethrough, and wherein each aperture of the plurality of apertures of the polymer layer is aligned with a single respective aperture of the plurality of apertures of the reinforcing structure, wherein the polymer layer comprises a resilient material.

12. A modular and removable screen panel for a vibratory machine, the screen panel comprising:
a reinforcing structure, the reinforcing structure comprising a first plurality of bridge elements having respective top surfaces and a second plurality of bridge elements having respective top surfaces, the second plurality of bridge elements intersecting the first plurality of bridge elements to define a plurality of apertures;
a polymer layer defining a plurality of apertures therethrough, and wherein the polymer layer is arranged over the reinforcing structure such that the polymer layer covers all respective top surfaces of the first plurality of bridge elements and covers all respective top surfaces of the second plurality of bridge elements; and
a plurality of partial bridge elements extending away from a perimeter of the screen panel defined at least partially by the first plurality of bridge elements or the second plurality of bridge elements.

13. The screening system of claim 11, wherein the reinforcing structure further defines a bottom portion, and wherein the polymer layer covers the bottom portion of the reinforcing structure.

14. The screening system of claim 11, wherein the polymer layer defines one or more fastener features configured to secure the at least one of the first screen panel or the second screen panel to a support frame.

15. The screening system of claim 1, wherein respective end faces of the plurality of partial bridge elements of the second screen panel do not contact respective end faces of respective ones of the plurality of partial bridge elements of the first screen panel.

16. A screening system for a vibratory machine, the screening system comprising:
a first screen panel comprising a plurality of first bridge elements that defines a plurality of first apertures therethrough in a vertical direction, a first perimeter of the first screen panel being defined by at least a portion of the first plurality of bridge elements, wherein the first screen panel is modular and removable from the screening system;
a plurality of first partial bridge elements extending away from the first perimeter of the first screen panel;
a second screen panel comprising a plurality of second bridge elements that defines a plurality of second apertures therethrough in the vertical direction, a second perimeter of the second screen panel being defined by at least a portion of the second plurality of bridge elements, wherein the second screen panel is modular and removable from the screening system independently of the first screen panel; and
a plurality of second partial bridge elements extending away from the second perimeter of the second screen panel, wherein the plurality of first partial bridge elements and the plurality of second partial bridge elements meet along an intersection line and define a plurality of intersection apertures when installed in the screening system.

17. The screening system of claim 16, further comprising:
a first frame member configured for receipt within a support structure along the intersection line to support the first screen panel;
a plurality of first downward extending portions that extend down from a bottom surface of at least one of the first plurality of partial bridge elements to the first frame member;
a second frame member configured for receipt within the support structure along the intersection line to support the second screen panel; and a plurality of second downward extending portions that extend down from a bottom surface of at least one of the second plurality of partial bridge elements to the second frame member.

18. The screening system of claim 17, wherein the first frame member, the plurality of first downward extending portions, and the first plurality of partial bridge elements defines one or more lateral apertures.

19. The screening system of claim 18, wherein the one or more lateral apertures extend along a direction parallel to the first plurality of partial bridge elements.

* * * * *